H. ROTH.
CONVEYING TROUGH.
APPLICATION FILED MAY 2, 1910.

1,022,332.

Patented Apr. 2, 1912.

2 SHEETS—SHEET 1.

Witnesses:

Inventor
Hugo Roth

H. ROTH.
CONVEYING TROUGH.
APPLICATION FILED MAY 2, 1910.
1,022,332.
Patented Apr. 2, 1912.
2 SHEETS—SHEET 2.
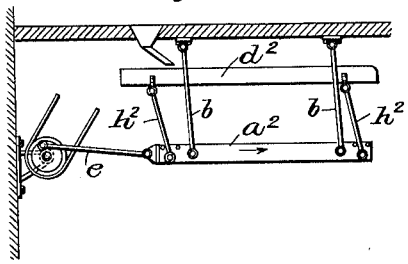
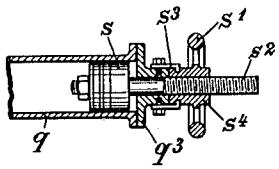
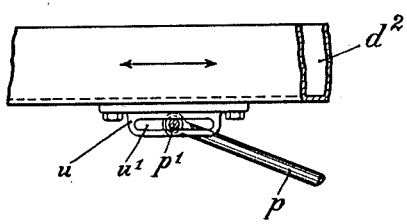
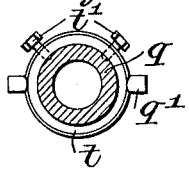
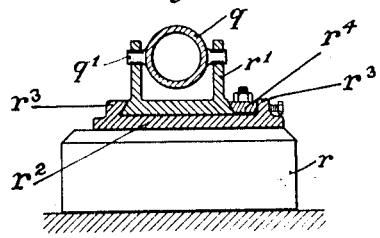
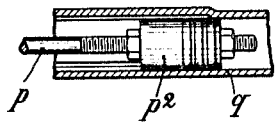
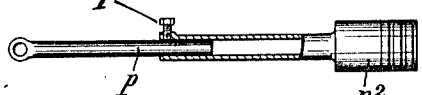

UNITED STATES PATENT OFFICE.

HUGO ROTH, OF BRUNSWICK, GERMANY, ASSIGNOR TO AMME, GIESECKE & KONEGEN, AKTIENGESELLSCHAFT, BRAUNSCHWEIG, OF BRUNSWICK, GERMANY, A CORPORATION OF GERMANY.

CONVEYING-TROUGH.

1,022,332.  Specification of Letters Patent.  Patented Apr. 2, 1912.

Application filed May 2, 1910. Serial No. 558,990.

*To all whom it may concern:*

Be it known that I, HUGO ROTH, a subject of the Emperor of Germany, residing at Brunswick, Duchy of Brunswick, Empire of Germany, have invented certain new and useful Improvements in Conveying-Troughs, of which the following is a specification.

This invention relates to improvements in conveying troughs which have a reciprocating movement whereby any desired material is fed forward in such a way that during the forward stroke of the trough the said material takes part in the movement of the trough, whereupon it is thrown forward by its energy upon the reversing of the movement of the trough and the return stroke thereof.

One of the objects of the invention is to provide a trough of this class in which the force of the operating mechanism required for throwing the trough forward or retarding the movement of the same is comparatively small.

With this object in view the invention consists in constructing the feeding trough in such a way, that it is movable relatively to its driving mechanism, for which purpose the said trough is connected with the driving mechanism through the intermediary of rocking levers, which may either be constructed in the manner of hangers or in the form of rocking pillars supporting the trough at their upper ends. As is known in the art, by reversing the direction of the movement of the conveying trough which is done rather suddenly, considerable stress is exerted on the driving mechanism, and the said stress is considerably reduced in the improved construction. Furthermore by using rocking arms for supporting the trough the stroke of the trough is comparatively large while the stroke of the driving mechanism is small.

For the purpose of explaining the invention three examples embodying the same have been shown in the accompanying drawings in which the same letters of reference have been used in all the views to indicate corresponding parts.

Figure 1:
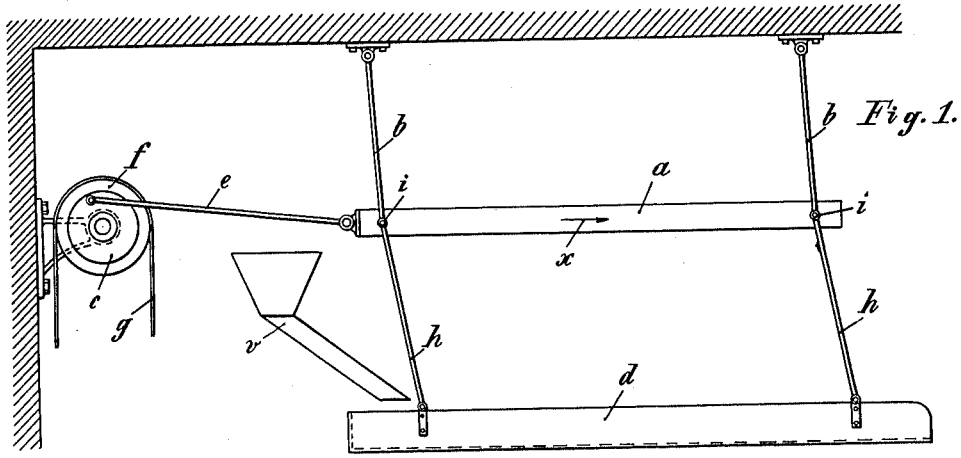
Figure 2:
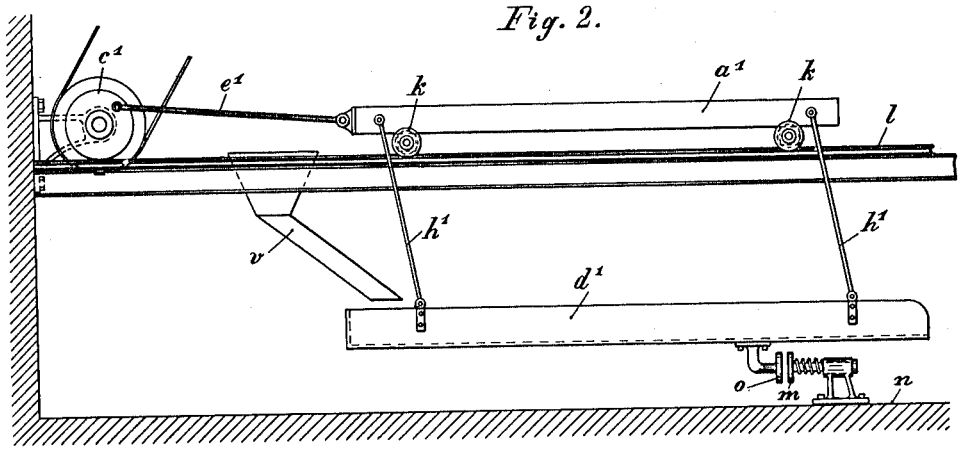
Figure 3:
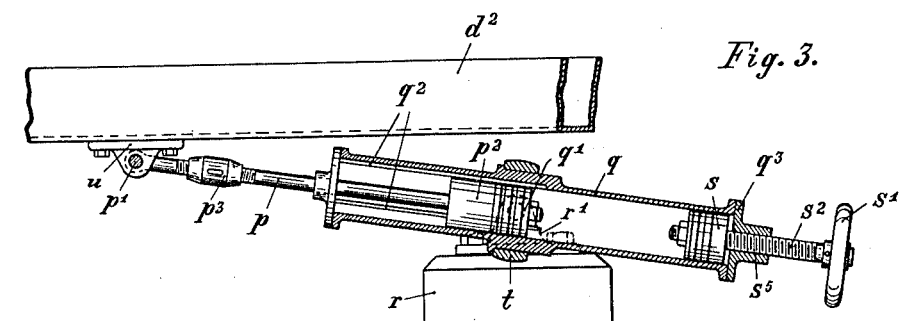

In said drawings—Figure 1, is a side view of a conveying trough. Fig. 2, is a side view of a modification of the same. Fig. 3, is a detail view, partly in section, of a buffer for reversing the trough at the end of its stroke. Fig. 3ª is a sectional detail view of an element which is employed in the buffer construction shown in Fig. 3. Fig. 4 is a sectional view showing an alternative device for adjusting the buffer shown in Fig. 3. Fig. 5 is a view showing an adjustable piston rod pivot connection which may be provided for the buffer shown in Fig. 3. Fig. 6 is a sectional view showing an adjustable mounting for the cylinder of the buffer shown in Fig. 3. Fig. 7 is a sectional view showing an adjustable connection for the piston of the buffer shown in Fig. 3. Fig. 8 is a sectional view of a telescopic piston rod construction for the buffer shown in Fig. 3, and Fig. 9 is an elevation of a further modified construction of trough suspension means.

Referring to the example of the invention illustrated in Fig. 1, the upper part of the improved conveying trough is in its form similar to the conveying troughs as heretofore constructed. As shown a reciprocatory beam $a$ is suspended from a suitable support by means of rods or hangers $b$, $b$, and it is connected to a suitable driving mechanism by means of a connecting rod $e$ in such a way that it is elevated on its forward stroke which takes place in the direction of the arrow $x$, while it is lowered upon its return stroke. As shown the driving mechanism consists of a crank disk $c$ to which the connecting rod $e$ is jointed, and which is rotated by means of a pulley $f$ driven from a suitable source of energy by a belt $g$ or the like. The beam $a$ is equipped with a member $d$ which is movable relatively thereto and which is constructed in the form of a trough. As shown the connection between the beam $a$ and the trough $d$ is effected by means of hangers or arms $h$ which at their upper ends are jointed to pivots $i$ of the bar $a$. The material to be fed by the trough $d$ may be supplied thereto by means of a funnel $v$.

Instead of constructing the rods $h$ in the form of hangers by means of which the trough $d$ is suspended from the beam $a$, they may be constructed as rocking pillars, by means of which the trough $d$ is disposed above the beam $a$. Such an arrangement is shown in Fig. 9, wherein the conveying trough $d^2$ is supported at the upper ends of rocking pillars $h^2$, being pivoted to said pillars or links. The latter, at their lower ends, are pivoted to the reciprocating beam $a^2$, which is connected to the driving mechanism by the link $e$ and is supported by the hangers $b$, as in the construction of Fig. 1. The swinging movement of the pillars $h^2$ is limited, for example, by stops $h^3$, suitably arranged on the beam $a^2$.

In the example illustrated in Fig. 2, the arrangement is such that the throwing operation of the beam $a$ is dispensed with. As shown the bar or beam $a'$ is reciprocated in the same way as the beam $a$ of the example shown in Fig. 1 by means of a crank disk $c'$ and a connecting rod $e'$. The beam $a'$ is mounted on suitable rollers $k$ which run on a suitable guide way formed by rails $l$, so that the beam has a rectilinear movement. The conveying operation is effected by means of a buffer $m$ which is mounted on a relatively fixed part of the mechanism or on the floor $n$ of the building. Against the latter the trough $d'$ is thrown, said trough being suspended from the beam $a'$ by means of hangers or links $h'$ which are pivoted to said beam so as to have free swinging movement with respect thereto. The trough is equipped with a head $o$ which strikes against the buffer $m$ at the end of the forward stroke of the trough $d'$, while the latter has an unimpeded swinging movement when moving in the opposite direction. In the arrangement shown the method of mounting the trough on the beam $a'$ is advantageous in this respect, that the shock caused by the buffer $m$ does not react on the driving mechanism.

Fig. 3 shows a part of a modification of the conveying trough on an enlarged scale. As shown the trough is provided with a buffer construction which is particularly useful in the improved apparatus. To a pivot $p'$ of the trough $d^2$ a piston rod $p$ is jointed which at its opposite end carries a piston $p^2$. Upon the reciprocating movement of the trough $d^2$ the said piston reciprocates within a cylinder $q$ which has a support on a bracket $r'$ mounted on a block $r$, so that the cylinder can rock about its pivot $q'$ in a vertical direction. The inner wall of the cylinder is formed over a part of its length with axial grooves $q^2$. While the piston moves within the part of the cylinder which is provided with the grooves $q^2$ it is not affected by the air inclosed within the cylinder because the said air can flow from one side of the piston to the opposite one through the grooves $q^2$. But when the piston passes into the portion of the cylinder which is not provided with grooves $q^2$ it compresses the air inclosed therein so that the said compressed air forms an effective buffer for arresting and reversing the movement of the trough $d^2$. In order to increase the action of the buffer a plunger $s$ is inclosed within the rear portion of the cylinder which is provided with a screw-threaded spindle $s^2$ projecting through the head $q^3$ of the cylinder and provided at its outer end with a hand wheel $s'$ by means of which the plunger $s$ can be axially adjusted within the cylinder $q$. The hand wheel may either be fixed to the spindle $s^2$, in which case the latter is guided in an internally screw-threaded bore $s^5$ of the cylinder head $q^3$, or as shown in Fig. 4, the hub $s^4$ of the hand wheel $s'$ is provided with internal screw-threads and connected to the cylinder head $q^3$ by means of claws $s^3$ or the like. By means of the hand wheel the piston $s$ can be adjusted within the cylinder $q$, so that the size of the air chamber of the cylinder and thereby the action of the buffer are changed. While specific means to adjust the plunger within the cylinder $q$ have been described it should be understood, that the invention is not limited to the specific means shown, and that other means may be provided which serve the same purpose. If it is desired to change the moment at which the buffer acts the pivot $p'$ threaded bore $s^5$ of the cylinder head $q^3$, of the piston rod $p$ may be made adjustable relatively to the trough $d^2$ for which purpose the pivot $p'$ is shifted, as shown in Fig. 5, in a longitudinal slot $u'$ of a block $u$ carrying the said pivot. Another means consists in making the pivots $q'$ of the cylinder adjustable longitudinally of the feeding stroke of the gutter, for which purpose the bracket $r'$, as shown in Fig. 6, is made shiftable on the block $r$ in a clamping plate $r^2$ having dovetailed borders $r^3$ between which the bracket $r'$ can be clamped by means of a wedge $r^4$. For the same purpose of making the pivots $q'$ adjustable these pivots $q'$ may be formed on a ring $t$ which is clamped in the cylinder $q$ by means of clamping screws $t'$, as is shown in Figs. 3 and 3ª. A further means consists in adjusting the piston $p^2$ on its piston rod $p$, for example by means of a screw and nut connection (Fig. 7). Finally the moment at which the buffer action takes place may be changed by varying the length of the piston rod, for which purpose the said piston rod may be constructed of a plurality of telescoping sections (Fig. 8), which are rigidly connected by means of a screw $p^4$, or two sections which are connected with each other by means of a sleeve $p^3$ having right and left internal screw threads, as shown in Fig. 3.

Claims:

1. The combination with a conveying trough of a reciprocating driving mechanism for the same and freely swinging links pivotally pendant from the driving mechanism and pivotally connected to and supporting the trough, the links providing for free reciprocating movement of the trough with relation to the driving mechanism.

2. The combination with a conveying trough of a driving mechanism for the same which includes a reciprocatory beam, and freely swinging links pivotally pendant from the beam and pivotally connected to and supporting the trough, the links providing for free reciprocating movement of the trough with relation to the beam.

3. The combination with a conveying trough of a driving mechanism for the same, which includes a reciprocating beam, and freely swinging bars pivotally connected to the beam and to the trough, the swinging movement of the bars being consequent to the reciprocating movement of the beam and providing for free reciprocating movement of the trough with relation to the beam.

4. The combination with a conveying trough of a reciprocating driving mechanism for the same, freely swinging links pivotally pendant from the driving mechanism and pivotally connected to and supporting the trough and means to arrest and cushion the feeding movement of the trough near the end of its stroke.

5. The combination with a conveying trough, of a driving mechanism for the same, which includes a reciprocating beam, freely swinging bars pivotally connected to the beam and to the trough, the swinging movement of the bars being consequent to the reciprocating movement of the beam and providing for free reciprocating movements of the trough with relation to the beam, and means to arrest and cushion the feeding movement of the trough near the end of its stroke.

In testimony whereof I have hereunto set my hand in presence of two subscribing witnesses.

HUGO ROTH.

Witnesses:
 KARL MUNDT,
 WILHELM LEHRKE.